United States Patent [19]

Perry

[11] 4,228,422

[45] Oct. 14, 1980

[54] SYSTEM FOR DISPLAYING AT A REMOTE STATION DATA GENERATED AT A CENTRAL STATION AND FOR POWERING THE REMOTE STATION FROM THE CENTRAL STATION

[75] Inventor: James C. Perry, Bowie, Md.

[73] Assignee: The United States of America as represented by the Administrator of the National Aeronautics and Space Administration, Washington, D.C.

[21] Appl. No.: 965,367

[22] Filed: Nov. 30, 1978

[51] Int. Cl.³ ...................... H04B 3/54; G04C 13/02
[52] U.S. Cl. ............................ 340/310 A; 340/309.4; 340/310 R; 340/870.24; 370/85; 368/47
[58] Field of Search ........ 340/310 R, 310 A, 310 CP, 340/177 R, 183, 309.4, 203, 186, 309.1, 167 R, 167 A, 206; 307/140, 149, 31; 58/152 R, 24 R; 179/15 AL; 370/85, 92

[56] References Cited

U.S. PATENT DOCUMENTS

| | | | |
|---|---|---|---|
| 1,920,179 | 8/1933 | Battegay | 58/24 R |
| 2,248,164 | 7/1941 | Dicke | 340/310 R |
| 2,297,816 | 10/1942 | Torkelson | 340/310 R |
| 3,838,411 | 9/1974 | Vander Meer | 340/310 R |
| 4,139,737 | 2/1979 | Shimada et al. | 340/183 |

FOREIGN PATENT DOCUMENTS

| | | | |
|---|---|---|---|
| 2252746 | 5/1974 | Fed. Rep. of Germany | 58/24 R |
| 2701184 | 7/1978 | Fed. Rep. of Germany | 340/310 A |

OTHER PUBLICATIONS

"DC Power Line Transceiver", Bekkers et al., *IBM Technical Disclosure Bulletin*, Oct. 1972, pp. 1424-1425.

*Primary Examiner*—John W. Caldwell, Sr.
*Assistant Examiner*—James J. Groody
*Attorney, Agent, or Firm*—Ronald F. Sandler; John R. Manning; John O. Tresansky

[57] ABSTRACT

A system for displaying at a remote station data generated at a central station and for powering the remote station from the central station. A power signal is generated at the central station and time multiplexed with the data and then transmitted to the remote station. An energy storage device at the remote station is responsive to the transmitted power signal to provide energizing power for the circuits at the remote station during the time interval data is being transmitted to the remote station. Typically, the data is time of day information and the remote station effects remote display of the time.

Energizing power for the circuits at the remote station is provided by the power signal itself during the time this signal is transmitted. Preferably the energy storage device is a capacitor which is charged by the power signal during the time the power is transmitted and is slightly discharged during the time the data is transmitted to energize the circuits at the remote station. The transmitted time of day data is pulse width modulated and decoder circuitry at the remote station is responsive to the transmitted data to effect decoding thereof.

13 Claims, 6 Drawing Figures

SYSTEM FOR DISPLAYING AT A REMOTE STATION DATA GENERATED AT A CENTRAL STATION AND FOR POWERING THE REMOTE STATION FROM THE CENTRAL STATION

ORIGIN OF INVENTION

The invention described herein was made by an employee of the United States Government and may be manufactured and used by and for the Government for governmental purposes without the payment of any royalties thereon or therefor.

BACKGROUND OF THE INVENTION

This invention relates to data display systems and, in particular, to systems for remotely displaying data such as the time of day.

Previous systems for remotely displaying time of day information basically involve either the parallel or serial transmission of the time data. Typically, in parallel transmission systems, 30 line drivers are required at the sending end with a 30 wire cable connecting the remote read-out to the master generator. Further, the remote display unit requires 30 line receivers with nine, 4-to-10 (for Nixie) or 4-to-7 segment (for LED) decoders depending on the type of display. Also a large power supply is required to operate the logic circuitry in the remote display where as much as 250 volts D.C. is required if gas discharge type read-outs are employed.

In serial transmission systems, a serial code is employed with a frame sync pattern to transmit BCD data in segmented time divisions, requiring sub-frame identification and a modulated carrier. At the remote display, a sophisticated automatic gain control is required to normalize the signal so it can be reliably demodulated. Further, a frame sync detector is required along with frame sync counters, data storage, 4-to-10 or 4-to-7 decoders, along with display drivers, current limiting resistors for each segment and a large power supply with several voltages to operate the logic circuitry. Again, a high power supply voltage (approximately 250 volts D.C.) is needed if a gas display read-out is employed.

It is known in the prior art to transmit data from a first location to a second location over a single line and to send a power signal back to the first location from the second location over the same line. Thus, a data collection system is known wherein a series of remote transmitters are connected to sensors for forwarding data to a central receiver. Power for the transmitters is sent over the line to recharge batteries respectively associated with the transmitters. It is also known to provide a digital compass which is supported by a gimbal assembly which, in turn, is electrically connected to a conductor. Energizing power is supplied to the compass through the gimbal and data for read-out in the same manner. Other telemetry systems and similar systems are also known having a signal line carrying power in one direction and data in the other. However, in none of the foregoing systems are the power and data both transmitted in the same direction to a remote device such as a remote time display.

SUMMARY OF THE INVENTION

This invention relates to a system for displaying at least one remote station data generated at a central station and for powering the remote station from the central station over the same line employed for data transmission. The foregoing is effected by circuitry which results in a straightforward, low cost, small size, reliable, data display device having low energy requirements and no power supply.

Other objects and advantages of this invention will be apparent from a reading of the following specification and claims taken with the drawing.

DETAILED DESCRIPTION OF THE PREFERRED EMBODIMENTS OF THE INVENTION

Figure 1:
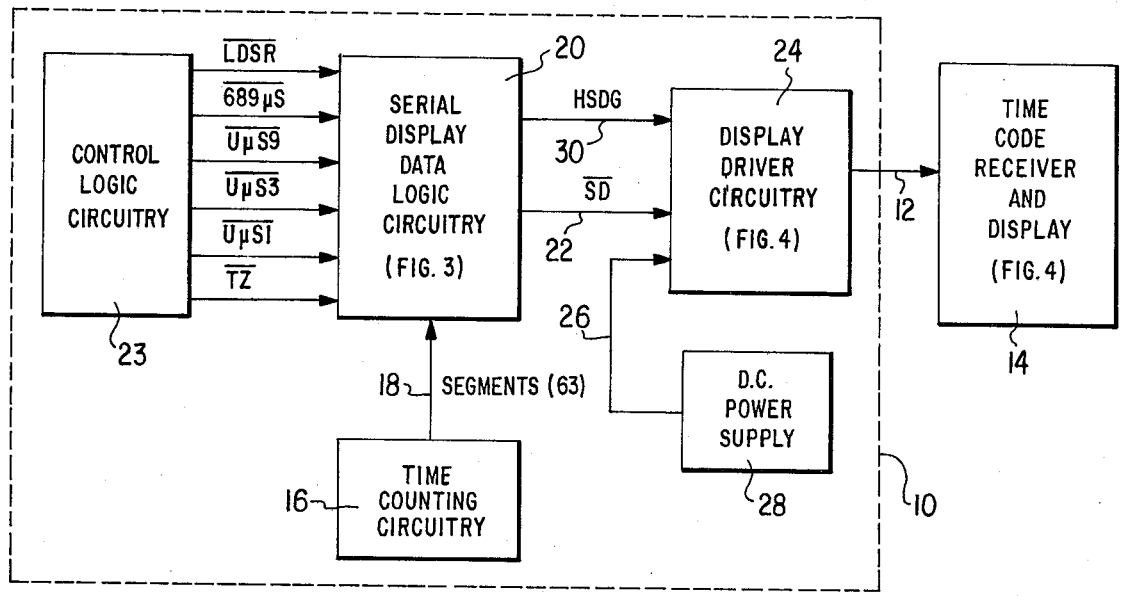
FIG. 1 is a block diagram of an illustrative, overall system in accordance with the invention.

Reference should be made to the drawing where like reference numerals refer to like parts.

In FIG. 1, there is shown an illustrative embodiment of an overall system in accordance with the invention where the generator 10 within the dotted block produces the data and power which are transmitted over line 12 to time code receiver and display 14. The generator 10 included conventional time counting circuitry 16 which may have 63 output lines indicated at 18 where the signals on the output lines correspond to the time of day (days (3 digits), hours (2 digits), minutes (2 digits), and seconds (2 digits)). Since, in this illustrative embodiment, the data is intended for LED display, there are 7 segments or lines assigned to each digit or a total of 63 lines for the 9 digits. The 63 segments are applied to serial display data logic circuitry 20 which serializes the parallel output from circuitry 16 and which pulse width modulates the serialized data as will be explained in more detail hereinafter with respect to FIG. 3, the serial data being applied to line 22. Data logic circuitry 20 is also responsive to various control signals generated by control logic circuitry 23.

The serialized data on line 22 is applied to display driver circuitry 24. Also applied to this circuitry is a D.C. power supply signal over line 26 from supply 28, the power signal normally being applied over line 12 to receiver 14. However, the power signal is inhibited by a gate signal from circuitry 20 over line 30 when data occurs on line 22.

Figure 2:
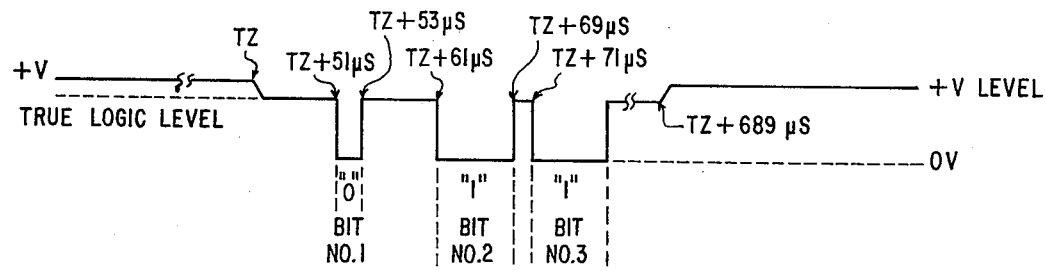
FIG. 2 is a waveform showing an illustrative data signal employed in the system of FIG. 1.

Referring to FIG. 2, there is illustrated a typical time multiplexed, composite signal which is applied to line 12 by generator 10. At the beginning of each second, or time zero (TZ as produced by circuitry 23), the D.C. power +V is removed from line 12 by gate signal HSDG on line 30 as will be explained in more detail hereinafter with respect to FIGS. 3 and 4. The power is not again applied to line 12 until TZ +689 microseconds of each second. At the beginning of each second, the D.C. power drops from the +V level (approximately +6.0 V dc) to the true logic level (approximately +4.0 V dc) where it is held until TZ +51 microseconds. At TZ +51 microseconds the data is tranmitted at a 100-kHz bit rate with a logic level at 0 V dc for 2 microseconds representing a logic "0" and a logic level at 0 V dc for 8 microseconds representing a logic "1".

Figure 3:
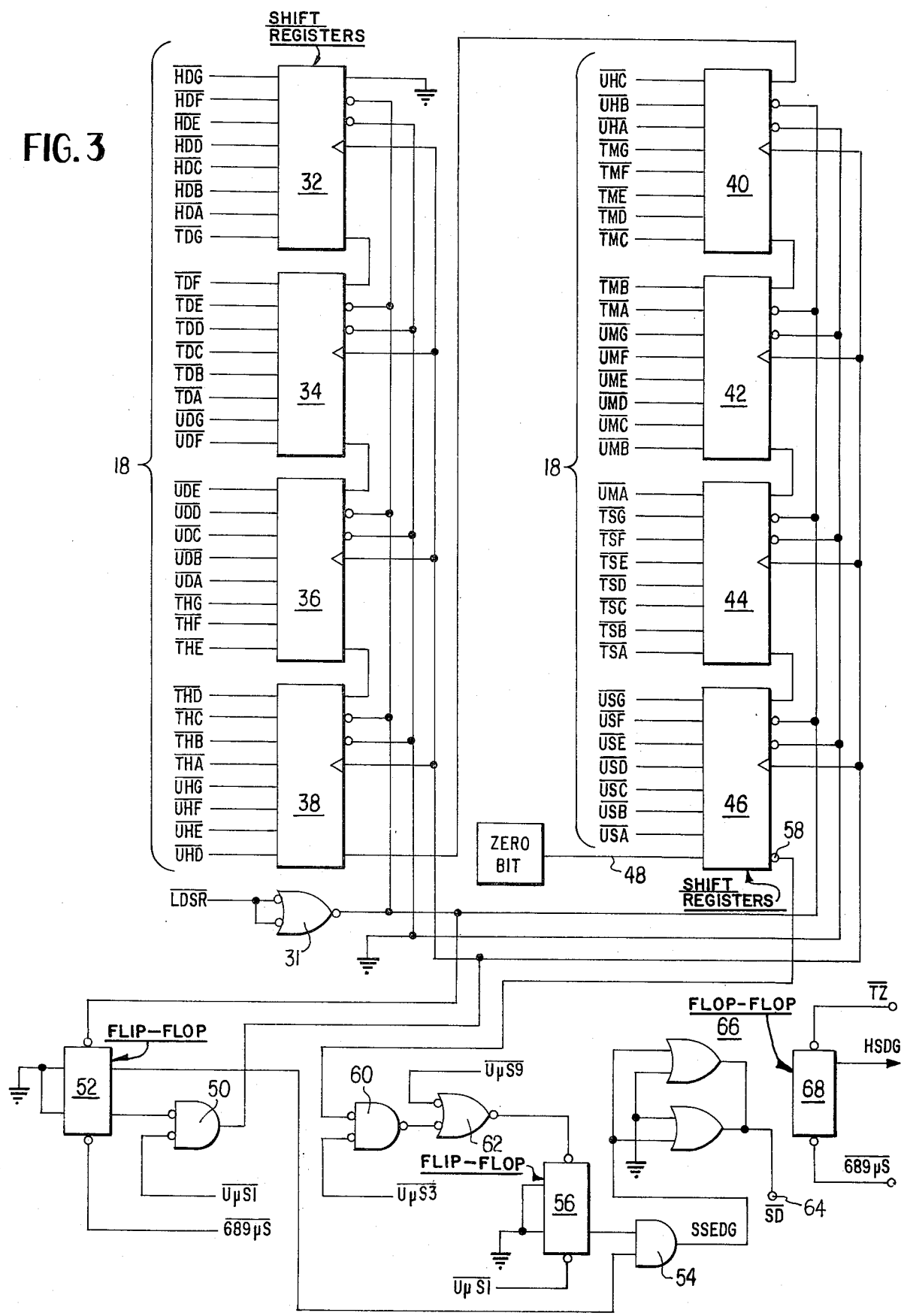
FIG. 3 is a combined block and schematic diagram of illustrative serial display data logic circuitry for use in the system of FIG. 1.

Reference is now made to FIG. 3 which shows illustrative data logic circuitry 20 for generating the signal of FIG. 2 from the 63 parallel segments from time counting circuitry 16. The 63 segments are loaded into a plurality of shift registers 32 through 46 by an $\overline{\text{LDSR}}$ (LOAD SHIFT REGISTER) signal, which is generated by control logic circuitry 23 at TZ +51 microseconds and passed through a gate 31. The hundreds digit of the "day" data is applied in parallel to shift register 32 and is represented by the letters HDA through HDG. The progression from the hundreds digit of the "day" data to the units digit of the "second" data is from register 32 through register 46 where the units "second" digit is represented by the letters USA through USG. At the same time, a zero bit is loaded into the last stage of register 46 over a line 48. An U$\mu$S1 signal then clocks the shift registers 63 times. This clock signal is generated by logic circuitry 23 every 10 microseconds starting 1 microsecond after TZ. The clock is applied through a gate 50 to the shift registers for as long as a flip-flop 52 is set. This flip-flop is set by $\overline{\text{LDSR}}$ and reset every 689 microseconds after TZ. Further, as long as flip-flop 52 is set, a gate 54 is conditioned to pass the output of a flip-flop 56.

Flip-flop 56 is unconditionally reset by U$\mu$S1. If output of terminal 58 of shift register 46 is low (logic "0"), U$\mu$S3 will set flip-flop 56 via a pair of gates 60 and 62. U$\mu$S3 is produced by logic circuitry 23 every 10 microseconds beginning at TZ +3 microseconds. Thus, if a logic "0" has been shifted to output 58 of register 46, flip-flop 56 will have been set 2 microseconds after the resetting thereof by U$\mu$S1. Hence, this would correspond to the generation of the 2 microseconds "0" bit No. 1 shown in FIG. 2.

If the output from terminal 58 of shift register 46 is high (logic "1"), gate 60 will not be conditioned to pass U$\mu$S3. Thus, flip-flop 56 will not be set until the occurrence of U$\mu$S9, this signal being produced by logic circuitry 23 every 10 microseconds beginning at TZ +9 microseconds. Thus, flip-flop 56 will not reset until 8 microseconds have elapsed from the resetting thereof by U$\mu$S1. This corresponds to the logic "1" bit No. 2 shown in FIG. 2.

The foregoing generation of serialized, pulse width modulated bits continues until the last of the 63 bits applied to registers 32 through 46 have been shifted to terminal 58 of register 46. The pulse width modulated signal $\overline{\text{SD}}$ (Serial Data) is then outputted at to a terminal 64 via a data logic driver indicated at 66.

As stated above, the data signal occurs during the time interval between TZ +51 microseconds (when flip-flop 52 is set) and TZ +689 microseconds (when the flip-flop is reset). With the resetting of flip-flop 52, the power signal is again transmitted over line 12 of FIG. 1, this being indicated in FIG. 2. As also indicated above, an HSDG (High Speed Data Gate) signal is employed to remove the power from line 12. This signal is generated by a flip-flop 68 which is set by TZ and reset by the 689 $\mu$S signal.

Figure 4A:
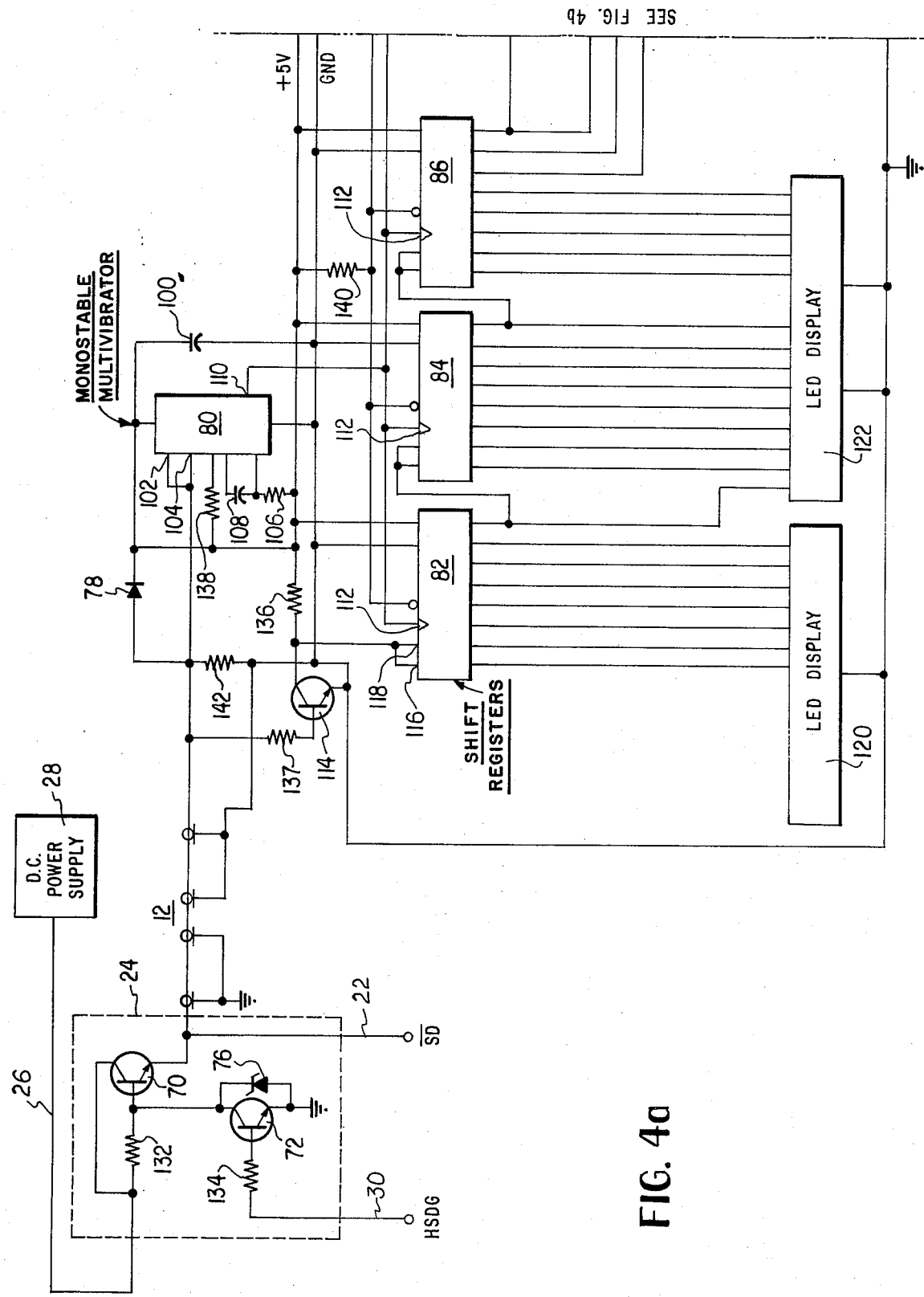
FIGS. 4a and 4b are a combined block and schematic diagram of illustrative display driver circuitry and time code receiver and display circuitry for use in the system of FIG. 1.
Figure 4B:
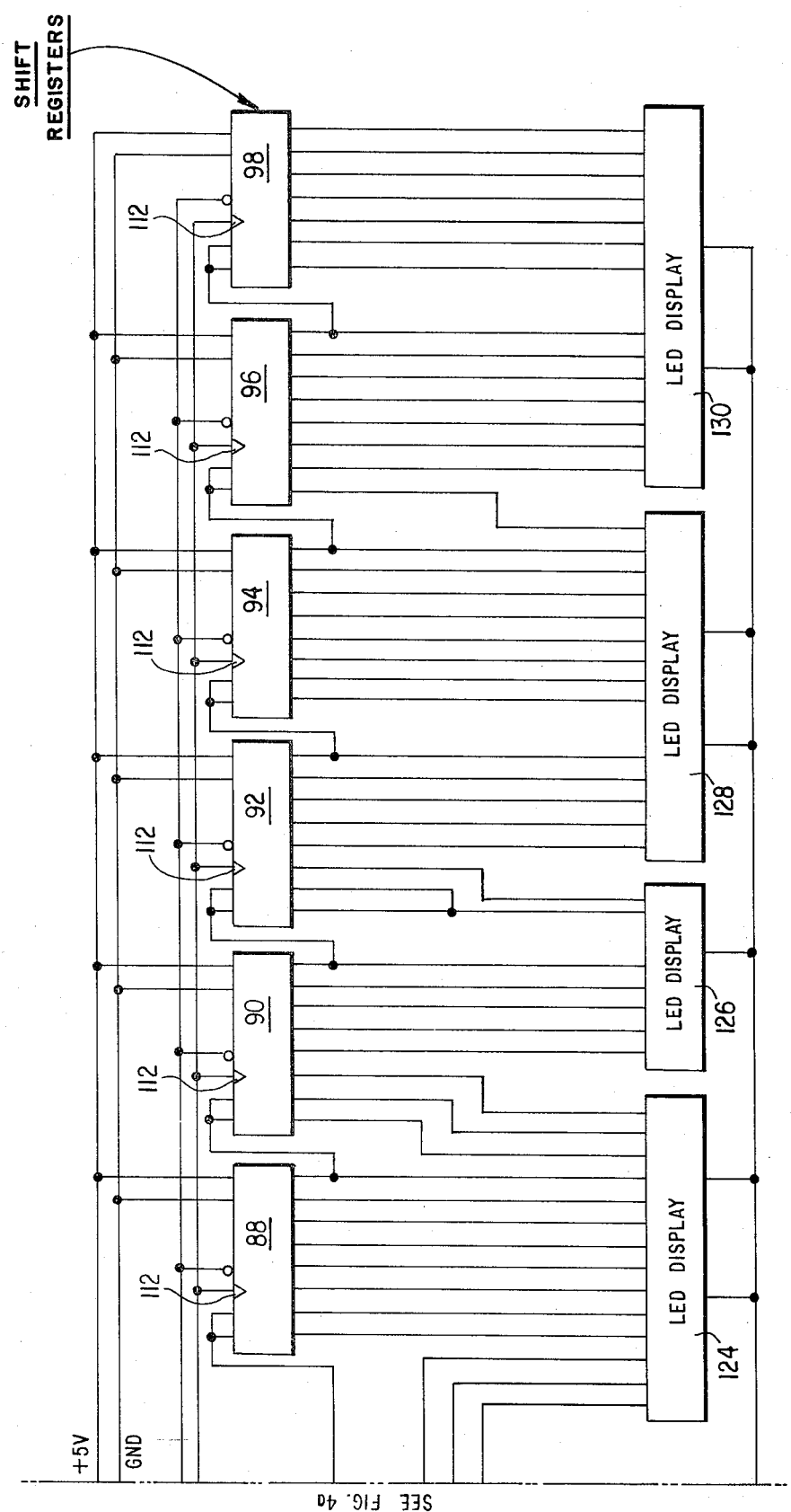

The HSDG and $\overline{\text{SD}}$ signals are applied to display driver circuitry 24 as shown in FIG. 4A. Also connected to circuitry 24 is D.C. power supply 28 via line 26. This power is applied to line 12 at all times except when data is transmitted. In particular, the D.C. power is applied through a transistor 70 to line 12. At TZ, HSDG (30) is generated to turn on a transistor 72 which, in turn, clamps the base of transistor 70 to ground thereby removing the D.C. power from line 12. The serial data SD can then be transmitted to line 12 via connection 22. Since power supply 28 may be unregulated, a Zener diode 76 is employed to maintain the base of transistor 70 at about 6 volts, for example, Accordingly, when transistor 70 is conducting, the emitter thereof is typically at about 5.5 volts, this level corresponding to the +V level of FIG. 2.

The data and power signals are thus time multiplexed over a plurality of successive cycles of typically 1 second duration where the data signal occurs during a first interval (TZ to TZ +689, for example) and the power signal occurs during a second interval of each cycle (from TZ +689 to the next TZ). It should be appreciated the transmission of the data signal can commence at some other time than TZ +51. Typically, the beginning of the data signal should be delayed after TZ to provide sufficient time for the +V signal to decrease to the true logic level of +4.0 volts shown in FIG. 2.

When D.C. power is on line 12, it is applied through a diode 78 in receiver 14 to supply D.C. power to a monostable multivibrator 80 and a plurality of serial-in, parallel-out shift registers 82 through 98. Further, the D.C. power charges a capacitor 100 to typically a +5 V dc level. When a data signal is on the line, diode 78 is preferably reverse-biased since the true logic level is +4 volts and since the size of capacitor 100 is preferably such that the voltage thereon decreases to no more than 4.5 volts during the time interval from TZ to TZ +689 microseconds. Accordingly, during this time the charge on capacitor 100 supplies D.C. power to multivibrator 80 and shift registers 82 through 98; however, it is preferably blocked from line 12 by diode 78.

Figure 5:
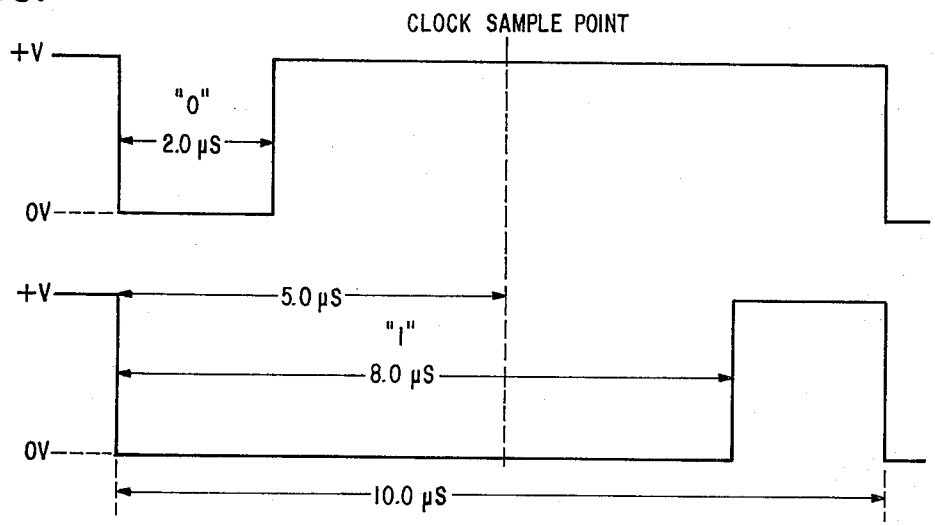
FIG. 5 shows waveforms illustrating the decoding operation effected at the time code receiver of FIG. 1.

At TZ +51 microseconds, the logic level drops from the true level (+4 V dc) to a zero level (0 V dc). This negative transition is applied to terminals 102 and 104 of multivibrator 80. After a delay of 5 microseconds as determined by resistor 106 and capacitor 108, a positive transition is applied from output terminal 110 to supply a clock signal to terminal 112 of shift registers 82 through 98, this being illustrated in FIG. 5.

The data signal is also applied to the base of a transistor 114 where it is inverted and applied to terminals 116 and 118 of shift register 82. If the input at these latter terminals is high at the 5 microseconds clock transistion, the register is set; if it is low, the register is reset. This process continues for 64 clock cycles of which 63 are retained for use by a 9 digit LED display (7 segments for each digit) represented by blocks 120 through 130.

Resistor 136 provides load resistance for transistor 114, resistor 138 provides the pull-up resistance for the unused gates within multivibrator 80 and resistor 140 does the same for shift registers 82 through 98. Resistor 142 is the termination resistance for line 12 while resistors 132, 134 and 137 provide current limiting. For illustrative values of the resistors and other components of the system of this invention, the table below may be consulted, it being understood there is no intent that the invention be limited to any or all of these component values.

| REFERENCE NUMERAL | DESCRIPTION | MANUFACTURER | MANUFACTURER PART NO. |
|---|---|---|---|
| 31,54 | Gate | Texas Instruments | 7408 |
| 32-58 | Shift Registers | Texas Instruments | 74LS165 |
| 50 | Gate | Texas Instruments | 74LS02 |
| 52,56 | Flip-flops | Texas Instruments | 74LS74 |
| 60 | Gate | Texas Instruments | 74LS32 |
| 66 | Drivers | Texas Instruments | 74128 |
| 70 | Transistor, silicon, high power, NPN | Motorola | MJE2100 |
| 72 | Transistor, silicon, low power, NPN | Motorola | 2N3904 |
| 76 | Diode, silicon reference, 6.8 V dc (nominal) | Motorola | 1N754A |
| 78 | Diode, silicon, hot-carrier, 400 mV (forward biased) | Motorola | 1N5820 |
| 80 | Integrated Circuit, monostable multi-vibrator, multiple-input | Texas Instruments | 74121 |
| 82-98 | Integrated Circuit 8-bit gated serial parallel-in, right/left shift register | Texas Instruments | 74164 |
| 100 | Capacitor, electrolytic, 330 $\mu$F, 10V | | |
| 106 | Resistor, fixed, composition, 7.5 K$\Omega$ ±10%, $\frac{1}{4}$W | | |
| 108 | Capacitor, ceramic 0.001 $\mu$F, 50 V | | |
| 114 | Transistor, silicon, low power, NPN | | |
| 120-130 | LED 7-segment | Monsanto | MAN6740 |
| 132,134 | Resistor, fixed, composition, 2 K$\Omega$ ±10%, $\frac{1}{4}$W | | |
| 136,137 | Resistor, fixed, composition, 5.6 K$\Omega$ ±10%, $\frac{1}{4}$W | | |
| 138,140 | Resistor, fixed, composition, 1 K$\Omega$ ±10%, $\frac{1}{4}$W | | |

Thus, in summary, there has been generally disclosed a system for displaying at at least one remote station 14 data generated at a central station 10 and for powering the remote station from the central station. The system generally may include means (power supply 28) at the central station for generating a power signal; means (circuits 20 and 24 of FIG. 1) for time multiplexing the data and power signal over a plurality of successive cycles so that the data occurs during a first interval (TZ to TZ +689 microseconds, for example) of each cycle and the power signal occurs during a second interval of each cycle (TZ +689 microseconds to the next TZ); transmission means (line 12, for example) for transmitting the time multiplexed signal to the remote station; storage means (capacitor 100) at the remote station responsive to the transmitted, time multiplexed signal for storing the power signal and display means (LED'S 120 through 130 at the remote station for displaying the data, the display means being powered by storage means 100 during the first interval of each cycle. Further, a rechargeable battery could be employed as the power storage means in place of capacitor 100. However, a capacitor is preferred as being more compact and less costly.

What is claimed is:

1. A system for displaying at at least one remote station data generated at a central station and for powering the remote station from the central station, said system comprising:
   means at the central station for generating a data signal;
   means at the central station for generating a power signal;
   means at the central station for time multiplexing the data signal and power signal over a plurality of successive cycles so that said data signal occurs during a first interval of each cycle and said power signal occurs during a second interval of each cycle;
   transmission means for transmitting the time multiplexed signals to the remote station;
   storage means at the remote station responsive to the transmitted time multiplexed signals for storing said power signal; and display means at the remote station for displaying said data signal, said display means being powered by said storage means during said first interval of each cycle.

2. A system as in claim 1 where said data signal is a time of day signal.

3. A system as in claim 1 where said display means is powered by said power signal during said second interval of each cycle.

4. A system as in claim 1 where said storage means comprises a capacitor which is charged by said power signal during said second interval of each cycle.

5. A system as in claim 4 including rectifying means, said capacitor being charged through said rectifying means.

6. A system as in claim 5 where said rectifying means prevents said power signal from being returned to said transmission means during said first interval of each cycle.

7. A system as in claim 1 where said data signal comprises a sequence of pulse width modulated signals and where said remote station includes a demodulator responsive to said modulated signals and powered by said storage means during said first interval of each cycle.

8. A system as in claim 1 or 7 where said central station includes means for generating a plurality of signals respectively corresponding to elements of symbols to be displayed by said display means and means for pulse width modulating each of said plurality of signals for transmission as said data signal during said first interval of each cycle.

9. A system as in claim 8 where said power signal generating means includes means for generating a D.C. signal during said second interval of each cycle.

10. A system as in claim 9 where said power signal generating means further includes means for interrupting said D.C. signal during the first interval of each cycle.

11. A system as in claim 8 where said pulse width modulated signals are either a first or second width and where said remote station includes demodulating means including (a) means responsive to said pulse width modulated signals for generating clock signals a predetermined time after the beginning of each pulse width modulated signal, said predetermined time being greater than the time corresponding to said first pulse width and less than the time corresponding to said second pulse width and (b) means responsive to said pulse width modulated signals and said clock signals to determine the width of each of the pulse width modulated signals.

12. A system as in claim 1 where said power signal generating means includes means for generating a D.C. signal during said second interval of each cycle.

13. A system as in claim 12 where said power signal generating means further includes means for interrupting said D.C. signal during the first interval of each cycle.

* * * * *